No. 641,494. Patented Jan. 16, 1900.
H. W. BROSKI.
COUPLING FOR RAILWAY RAILS.
(Application filed Sept. 1, 1899.)
(No Model.)
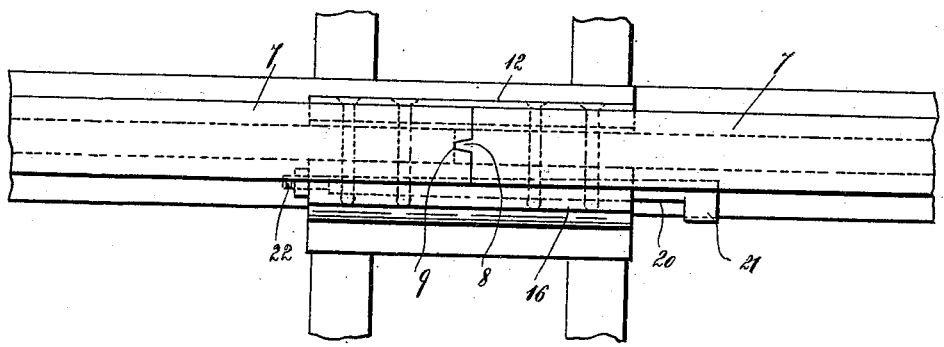
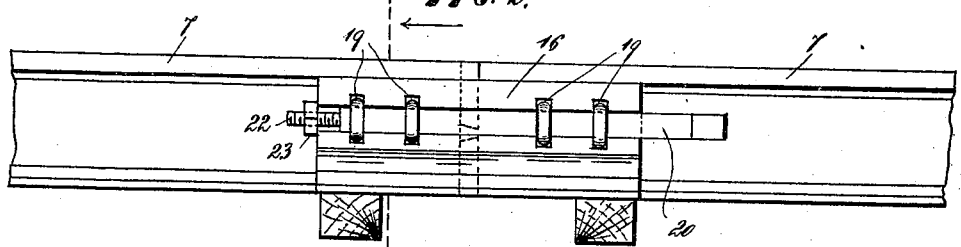
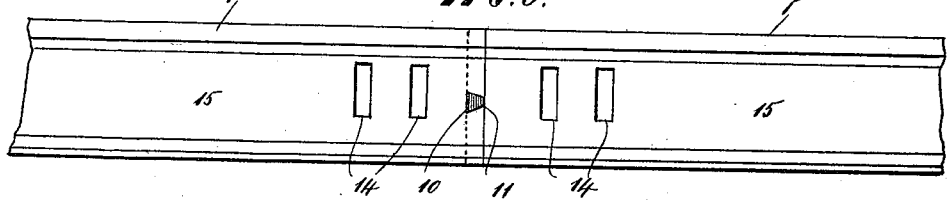
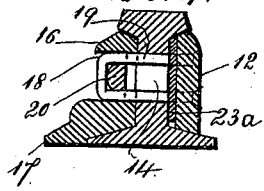 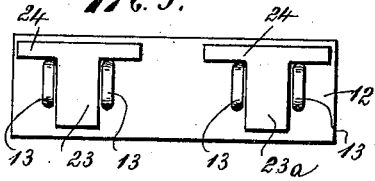
WITNESSES
INVENTOR
Henry W. Broski
BY
Edgar Tate & Co
ATTORNEYS
THE NORRIS PETERS CO., PHOTO-LITHO., WASHINGTON, D. C.

United States Patent Office.

HENRY WEBER BROSKI, OF BLAND, VIRGINIA, ASSIGNOR OF ONE-THIRD TO ROBERT C. ATKINS, OF SAME PLACE.

COUPLING FOR RAILWAY-RAILS.

SPECIFICATION forming part of Letters Patent No. 641,494, dated January 16, 1900.

Application filed September 1, 1899. Serial No. 729,267. (No model.)

*To all whom it may concern:*

Be it known that I, HENRY WEBER BROSKI, a citizen of the United States, residing at Bland, in the county of Bland and State of Virginia, have invented certain new and useful Improvements in Couplings for Railway-Rails, of which the following is a full and complete specification, such as will enable those skilled in the art to which it appertains to make and use the same.

This invention relates to means for coupling railway-rails; and the object thereof is to provide improved devices of this class by means of which the ends of railway-rails may be securely coupled and prevented from lateral and vertical movement.

The invention is fully disclosed in the following specification, of which the accompanying drawings form a part, in which—

Figure 1 is a plan view of the ends of two railway-rails coupled according to my invention. Fig. 2 is a side view thereof; Fig. 3, a view similar to Fig. 2, showing the ends of the rails with the coupling removed; Fig. 4, a cross-section on the line 4 4 of Fig. 2; Fig. 5, an inside view of the coupling with the outer plate or part removed, and Fig. 6 a plan view of a detail of the construction.

In the drawings forming part of this specification the separate parts of my improvement are designated by the same numerals of reference in each of the views, and in said drawings I have shown at 7 the ends of two railway-rails, and in the practice of my invention I provide the end of one of said rails with a central vertical rib or projection 8 and the end of the other with a corresponding central vertical recess 9, adapted to receive said rib or projection, and the end of one of said rails is also provided with a transverse rib or projection 10, which enters a corresponding transverse recess 11 in the other rail. This construction is clearly shown in Figs. 1 and 3, and when the ends of the rails are coupled together, as hereinafter described, they cannot move laterally or vertically.

In coupling the rails according to my invention I provide a fish-plate 12, (clearly shown in Figs. 1, 4, and 5,) and this plate is provided with staples 13, which are rigidly secured therein in any desired manner and which are preferably arranged in pairs, as shown in Fig. 5, and which pass through corresponding vertical slots or openings 14 in the central web 15 of the rails 7. The plate 12 is preferably placed on the inside of the rail, and on the outer side thereof I place a supplemental plate 16, having a broad base-flange 17 and a central longitudinal space 18 and provided with vertical or transverse slots or openings 19, similar to and adapted to register with the slots or openings 14, in the webs 15 of the rails 7. When the plates 12 and 16 are placed in position on the opposite sides of the rails the staples or loops 13 pass through the central webs of the rails and through the slots or openings 19 in the plate 16, and a wedge-shaped pin 20, provided at one end with a head 21 and at the other with a screw-threaded extension 22, is passed through said loops or staples and through the longitudinal space 18 in the plate 16, as clearly shown in Figs. 1, 2, and 4, and a nut 23 is screwed onto the threaded extension 22 of said wedge-shaped pin. The pin 23 draws the wedge-shaped pin 20 tightly into the staples or loops 19 and forces the plates 12 and 16 into close contact with the central webs 15 of the rails 7 and securely binds said rails together.

I also provide washers 23$^a$, which are composed of any suitable metal and which are preferably T-shaped in form, as shown in Fig. 5 and the body portions of which are placed between the separate pairs of the staples or loops 13 and are supported thereon by the cross-head 24 thereof, and the object of these washers is to make a tight coupling when the parts are worn by use. These washers are, as will be understood, not essential to my invention, and may or may not be employed.

It will thus be seen that I provide a simple and effective coupling for railway-rails and by means of which the ends of the rails are securely bound together and prevented from both lateral and vertical movement, and it will be apparent that changes in and modifications of the construction described may be made without departing from the spirit of my invention or sacrificing its advantages.

Having fully described my invention, I claim as new and desire to secure by Letters Patent—

A coupling for the ends of railway-rails, comprising vertical slots formed in the webs of the rails adjacent to the ends thereof, plates adapted to fit the sides of the webs of the rails, one of said plates being provided with staples or loops which pass through the slots in said webs, and the other plate with corresponding slots or openings, and in the outer side thereof with a longitudinal space and a key-pin which is passed through said staples or loops, and which is provided at its smaller end with a screw-threaded extension and a nut mounted thereon, and washers which are placed between the first-named plate and the webs of the rails, substantially as shown and described.

In testimony that I claim the foregoing as my invention I have signed my name, in presence of the subscribing witnesses, this 18th day of August, 1899.

HENRY WEBER BROSKI.

Witnesses:
SIDNEY J. BANKS,
THOMAS J. MUNCY.